March 16, 1943.  O. S. CARLISS  2,313,863
BEARING PLAY CONTROL DEVICE
Filed Feb. 2, 1942  2 Sheets-Sheet 1
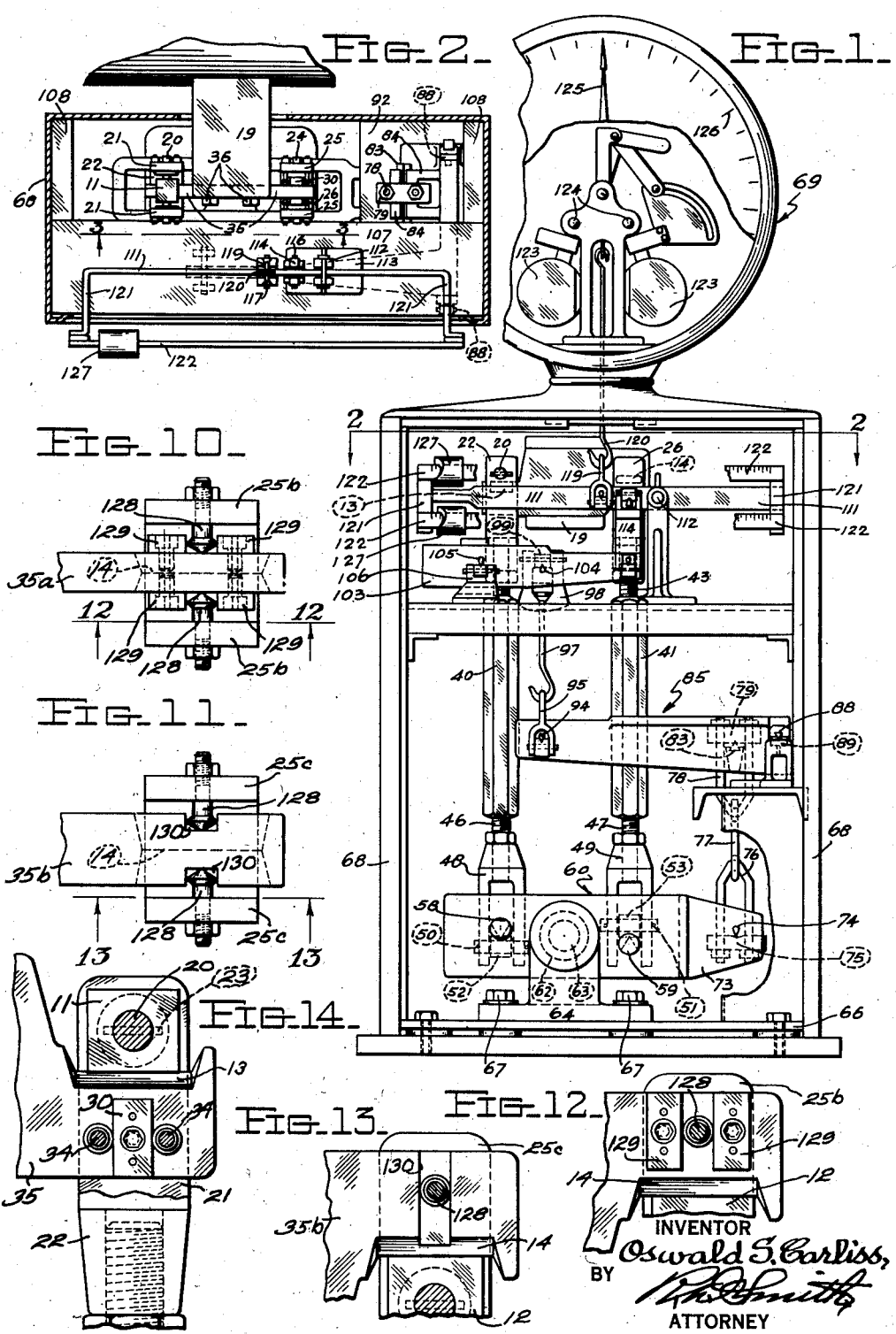
INVENTOR
Oswald S. Carliss,
BY
ATTORNEY March 16, 1943.　　　O. S. CARLISS　　　2,313,863
BEARING PLAY CONTROL DEVICE
Filed Feb. 2, 1942　　　2 Sheets-Sheet 2
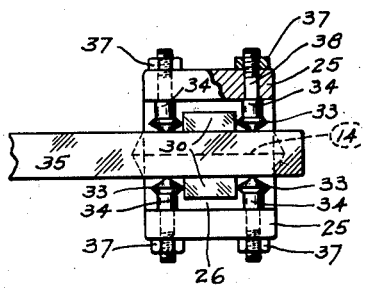
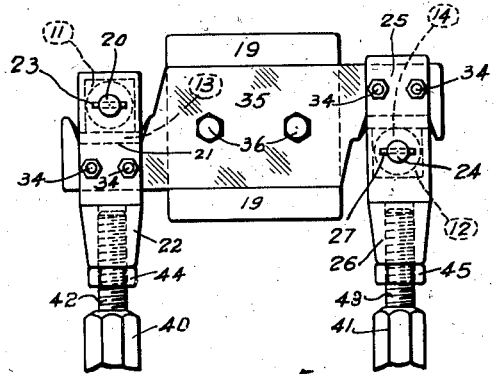
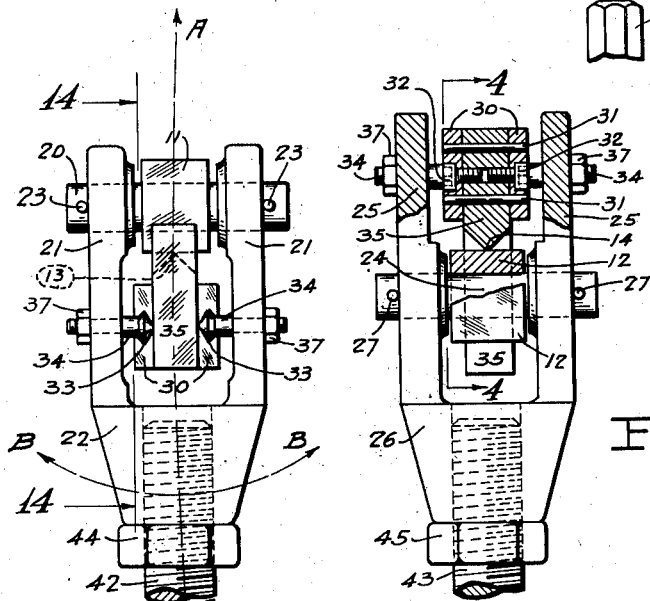
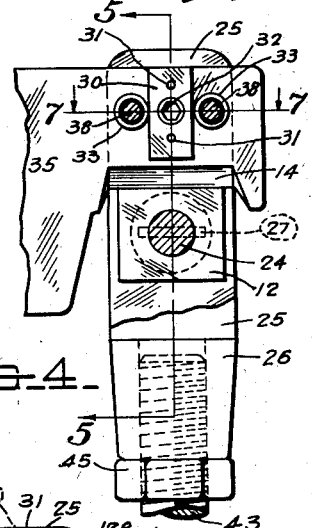
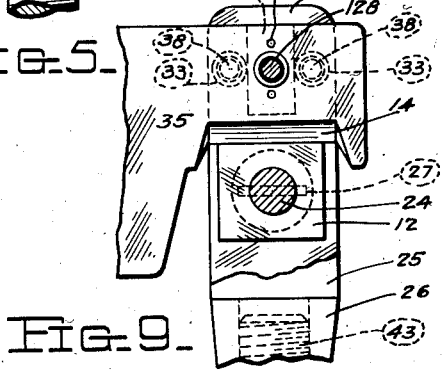
INVENTOR
Oswald S. Carliss
BY
ATTORNEY Patented Mar. 16, 1943

2,313,863

UNITED STATES PATENT OFFICE 2,313,863

BEARING PLAY CONTROL DEVICE

Oswald S. Carliss, Fairfield, Conn., assignor to The Kron Company, Bridgeport, Conn., a corporation of Connecticut Application February 2, 1942, Serial No. 429,289

5 Claims. (Cl. 308—2)

This invention relates to mechanism for transmitting force and movement between a weighable load and a load counter-balancing means, as in a weighing scale, for which purpose only a small amount of angular movement need take place between cooperative members which move relatively to each other while transmitting such force. The present improvements are particularly directed to antifrictional guide means for eliminating or restricting unwanted vagrant movement relatively between such members without in any appreciable degree opposing the designed relative movements thereof for transmitting the force of the weighable load.

A force measuring and indicating apparatus to which the present improvements are particularly applicable is fully illustrated and described in my copending application, Serial No. 370,097, filed December 14, 1940, of which this present application is a continuation in part. The present application is also a continuation in part of my copending application, Serial No. 402,312, filed July 14, 1941. These said copending applications claim major combinations herein disclosed and which may or need not incorporate the specific features herein claimed.

In order to care for that special condition of load application wherein an active load, such as the torque exerted by a dynamometer arm, may exert its force upon a single automatic counter-balancing and measuring mechanism in a constant direction whether such force originates in an upward or downward direction, a direction converting transmission may be employed involving a frame fulcrumed lever and two upright coupling rods.

One object of the improvements herein claimed is to reduce operating friction and eliminate objectionable wear and looseness between relatively movable pivotally coupled parts in a transmission of this nature, and to keep such parts accurately corelated for cooperating efficiently and with better protection against accidental disturbance or impairment.

A further object is to provide anti-frictional means for restricting play between a plate-like member and a yoke arm pivotally coupled thereto in a manner to permit controlled yet uncramped relative movement between said member and yoke.

The foregoing and other objects of the present improvements will become clear in greater particular from the following description of a preferred embodiment of the invention having reference to the accompanying drawings wherein:

Fig. 1 is a front view of the dial head unit of an automatic weighing scale supported on a hollow standard whose front wall is removed to expose an interior system of levers and linkage in which is incorporated the present improvements.

Fig. 2 is a plan view taken in section on the plane 2—2 in Fig. 1.

Fig. 3 is a fragmentary enlarged view looking in the direction of the arrows from the plane 3—3 in Fig. 2.

Fig. 4 is a still further enlarged fragmentary view of certain parts at the right end of Fig. 3 taken partially in section on the plane 4—4 in Fig. 5, looking in the direction of the arrows.

Fig. 5 is a view taken partially in section on the plane 5—5 in Fig. 4 looking in the direction of the arrows.

Fig. 6 is an elevation drawn on the same scale as Fig. 5 looking from left to right at Fig. 3.

Fig. 7 is a plan view looking downward on Fig. 4 taken partially in section on plane 7—7 in the latter figure.

Fig. 8 is a view like Fig. 7 showing a modification.

Fig. 9 is an enlarged view taken in section on the plane 9—9 in Fig. 8.

Fig. 10 is a view similar to Fig. 7 showing a different modification.

Fig. 11 is another view similar to Fig. 7 showing a still different modification.

Fig. 12 is a view taken in section on the plane 12—12 in Fig. 10 looking in the direction of the arrows.

Fig. 13 is a view taken in section on the plane 13—13 in Fig. 11 looking in the direction of the arrows.

Fig. 14 is a view corresponding to Fig. 4 showing the parts at the left end of Fig. 3 taken partially in section on the plane 14—14 in Fig. 6 looking in the direction of the arrows.

The complete apparatus of Figs. 1 and 2 comprises means to counterbalance and measure the force of torque transmitted to the apparatus by a torque arm 19. This arm will be understood to be fixedly carried in usual manner by the rotatably mounted field frame of a dynamoelectric machine (not shown) which frame tends to turn in the direction of rotation of the armature of such machine except as resisted by one or the other of floating bearing blocks 11 or 12 which receive the thrust of knife-edges 13 or 14, respectively. These knife-edges are carried at oppositie ends of a terminal plate 35 clamped fixedly against the extreme end of torque arm 19 by bolts 36 whereby knife-edge 13 in Fig. 6 moves in the arc A—A about the center of the dynamoelectric machine. A conventional type of dynamoelectric machine which may be used in this connection is disclosed in greater detail in my copending application Serial No. 323,569 filed March 12, 1940, wherein arm 19 and plate 35 are identified by corresponding reference numerals. From the aforesaid copending application it will be understood that the shaft of an engine, motor, or other prime mover whose horsepower is to be measured or tested, is coupled impellingly to the armature shaft of the before mentioned dynamoelectric machine so as to rotate said armature while the engine or motor is running. The work thus produced is absorbed, sometimes through the medium of electrical energy produced by the dynamoelectric machine, and a resultant torque force is exerted by arm 19 upward or downward depending on the direction of armature rotation.

Bearing block 11, sometimes in this art termed a "pan" and herein also referred to as a seat carrier, is freely rotatable on a pivot pin 20. This pin spans the space between arms 21 of the up-action yoke or shackle 22 and has its ends supported in the latter and is retained by cotter pins 23 or the like. Bearing block 12 is freely rotatable on a similar pivot pin 24. This pin spans the space between arms 25 of the down-action yoke or shackle 26 and has its ends supported in the latter and is retained by cotter pins 27 or the like. Each face of each end portion of plate 35 above its knife-edges 13 and 14 constitutes a thrust receiving surface and is, according to the form of these improvements shown in Figs. 1 to 7, inclusive, equipped with a boss-like projecting abutment or thrust block 30 which if made as a separately attached part may be fixedly located in relation to plate 35 by dowels 31 and clamped firmly against such plate by a holding bolt 32. The head of such bolt may contain a socket to accommodate a wrench, instead of a slot to take a screw driver. Each vertical edge of each thrust block 30 falls tangent to the largest periphery of the cone-shaped head 33 of a nose-like projection or guide stud 34 whose pointed end may contact slidingly with that face of plate 35 against which thrust block 30 is secured.

Each guide stud 34 is shouldered thereby to seat against the inner surface of shackle arm 21 or 25 and is drawn tightly against such arm by a nut 37 on the threaded end portion of a shank 38 of the guide stud. Shank 38 is of reduced diameter and passes with a snug slip fit through a hole in the shackle arm. Each pair of coaxially aligned guide studs 34 have their opposed head points spaced apart sufficiently to permit free vertical movement of the knife-edge carrier or plate 35 therebetween without binding, but they afford very little clearance for said plate horizontally and therefore the two pairs of these studs carried by each shackle maintain the shackle nicely aligned with the knife edge on the terminal plate so that each of the bearing blocks may have a perfectly flat, hardened, horizontal table surface engaged along a straight line of seating contact by its cooperative knife-edge with greater freedom from friction and wear, and less liability to derangement or irregularity in operation, than if the knife edge were seated more conventionally in a groove in such table surface. In Fig. 6, B—B represents the arc of rocking movement permitted to shackle 22 by and relative to its bearing block 11 about the latter's aforesaid line of seating contact with knife edge 13.

Two vertical coupling rods 40, 41 depend respectively from the shackles 22 and 26 and have top ends 42, 43 of reduced diameter in threaded engagement with said shackles, respectively, and are locked against turning movement relative thereto by check nuts 44, 45. Coupling rods 40 and 41 have similar bottom ends 46, 47 of reduced diameter which are in threaded engagement respectively with two downward directed shackles 48 and 49. Spaced arms of shackles 48 and 49 carry pivot pins 50 and 51 on which pins bearing blocks or "pans" 52 and 53 are respectively mounted and free to turn.

Bearing block 52 contacts with a knife-edge 58 and bearing block 53 contacts with a knife-edge 59, both of which knife-edges are fixedly mounted on the same direction converting lever 60 at exactly equal distances from the fulcrum thereof. As herein shown, this fulcrum may include ball bearings 62 affording pivotal support for the fulcrum shaft 63 and lodged respectively in the upstanding spaced arms of a stationary bearing bracket 64 which is fixedly secured on the base plate 66 of a hollow column or standard 68 by bolts 67. This column or standard includes frame work which supports at its top a dial head unit designated as a whole by 69. This unit may be constructed as illustrated and described in the U. S. Patent No. 2,083,413, granted June 8, 1937 to Glenn E. Weist.

As best shown in Figs. 1, 2 and 5, the aforesaid direction converting lever 60 is bifurcate, providing a central opening spanned by fixedly carried knife-edges 58, 59 and accommodating the shackles 48 and 49. This lever also has a forked terminal portion 73, the space between whose arms is spanned by a knife-edge 74 fixed in the lever. Said space accommodates a bearing pan 75 which is engaged by knife-edge 74 and is carried by a lower clevis 76 suspended from a link 77 which is coupled to an upper clevis 78 provided with the inverted bearing pan 79.

Bearing pan 79 rests rockably upon a knife-edge 83 carried by a duplex shelf lever 85 which is rockably seated at 88 on frame carried spaced fulcrum blocks 89. Shelf lever 85 is pivotally coupled at 94 to clevis yoke 95 which together with hook link 97 and its top clevis 98 serves to couple shelf lever 85 pivotally to a force reducing lever 103 at 104. Lever 103 is rockably seated at 105 on suitable fulcrum blocks stationed atop the U-shaped frame bracket 106.

In addition to the reducing lever 103, the hollow standard 68 contains the conventional tare lever 111 rockably supported on frame fulcrum 112. A conventional form of universal coupling link 114 may connect reducing lever 103 with tare lever 111. Tare lever 111 is operatively connected in conventional form by means of coupling yoke 119 and draft rod 120 with a pendulum type of automatic load counterbalancing and measuring mechanism in the dial head unit 69.

Complete details of this dial head unit are more thoroughly set forth in the before mentioned Patent No. 2,083,413, granted to G. E. Weist. It will suffice to mention here that as in the case of my hereinbefore mentioned copending application, Serial No. 323,569, the dial head unit includes load force counterbalancing pendulums 123 whose swinging movements about frame pivots 124 are converted into rotary movement of the indicator pointer 125 so that the latter sweeps over a scale of force magnitude indicia 126 shown in Fig. 1. The tare lever 111 may carry by means of arms 121 one or more graduated tare beams 122 equipped with slidable poises such as 127.

In operation it will be understood that torque arm 19 is mounted to swing about an axis so located that knife-edges 13 and 14 travel in the arc A—A in Fig. 6. Actually, it performs only a very small increment of movement which movement in Fig. 1 will be either upward or downward and practically in a vertical direction. When torque arm 19 tends to move downward it causes knife-edge 14 to depress the bearing carrier or block 12 and coupling rod 41 and hence swing lever 60 clockwise about its fulcrum 63. This draws downward on the linkage 76, 77, 78 with a reduction of force owing to the knife-edge 74 having a greater lever arm with respect to fulcrum 62 than has knife-edge 59. Hence a once reduced force is thus imparted to the duplex shelf lever 85 urging the latter counterclockwise or downward about its fulcrum 89. Consequently shelf lever 85 pulls downward through the linkage 95, 97, 98 on the force reducing lever 103. But up to this point a second reduction of force has been effected because knife edge 94 has a greater lever arm with respect to fulcrum 89 than has knife-edge 93. The consequent downward pull on force reducing lever 103 urges the latter clockwise about its fulcrum 106 so that through linkage 114 the tare lever 111 is urged counterclockwise about its fulcrum 112 by a still further diminished force. This thrice reduced force as imparted to tare lever 111 acts through linkage 119, 120 to lift the pendulums 123 of the automatic load counterbalancing mechanism of the dial head unit whose force indicating pointer 125 sweeps over a scale of indicia 126 to register the force exerted by torque arm 19.

When the torque arm exerts an upward instead of a downward pressure, this force instead of being resisted by bearing block 12 will be resisted by the seat carrier or block 11 resting on knife-edge 13. Through this medium, coupling rod 40 will be pulled upward and will act on knife-edge 58 to impart clockwise movement to direction reversing lever 60 in Fig. 1, just as in the case of the downward thrust on coupling rod 41, whereby the force exerted upward by torque 19 will be reduced once by lever 60, again by lever 85, and still again by lever 103 before being transmitted to the tare lever 111, all as described in the foregoing.

The restriction of sidewise play, and of the tendency of seat carrier 11 to rock laterally upon knife edge 13, which is caused by the two nose-like projecting studs 34 spaced crosswise of the designed plane of knife edge movement on each side of each end of plate 35, makes it feasible to provide seat carriers or bearing blocks 11 and 12 with entirely plain flat bearing surfaces omitting any V-groove therein which otherwise would be needed for orienting and retaining the knife-edges. Further restriction of play will be observed to be effective endwise of plate 35 because of the engagement of the narrowed circular edge of stud heads 33 with thrust blocks 30. While stud heads 30 can contact with the front and rear thrust receiving surfaces of plate 35, enough clearance is provided between these stud heads and the engaged surfaces of the plate 35 and thrust blocks 30 to permit the latter to move in unison with bearing blocks 11 and 12 upward and downward entirely free of cramping effect or appreciable frictional resistance.

As shown in Figs. 8 and 9, the construction may be modified to omit one of the thrust blocks 30 and both of the studs 34 which are shown to cooperate therewith in Fig. 7, and in the place of such thrust block and studs there may be provided a single stud 128 like 34 mounted in shackle arm 25a preferably central of the distance between the remaining pair of studs 34, or in other words, with the nose of its pointed head 33 in position to contact with the face of plate 35 at a point centrally opposite the remaining thrust block 30. This affords 3-point, instead of 4-point, facewise constraint and imposes upon only two studs and one thrust block the duty of edgewise constraint between plate 35 and the arms of either shackle 22 or 26 when modified as described.

As shown in Figs. 10 and 12, the construction may be further modified to employ only two coaxially related studs 128 mounted respectively in spaced arms 25b of the shackle. In this arrangement the knife-edge carrier or plate 35a has each of its opposite thrust receiving surfaces equipped with two thrust blocks 129, like 30, spaced apart edgewise to accommodate the stud head therebetween with the minimum of play requisite to freedom from binding.

As shown in Figs. 11 and 13, the construction may be modified still further to employ only the same two studs 128, 128 as in Figs. 9 and 11. But here, all thrust blocks such as 30 are omitted, and in their stead vertical grooves 130 are sunk into the side faces respectively of the knife edge carrier or plate 35b to a sufficient depth to admit the heads of studs 128 and slidingly fit the same as in the case of the spaced edges of thrust blocks 128 in Figs. 10 and 12.

It will be apparent that although the modified constructions of Figs. 7 to 12, inclusive, are illustrated only with respect to shackle 26, they are as easily incorporated into shackle 22 in the same manner, and that any arrangement of studs and guide shoulders shown in any figure of the drawings on either face or side of the knife edge carrier or plate may be combined with any arrangement shown in any other figure of the drawings on either face or side of the knife edge carrier.

The appended claims will be understood as contemplating and intending to cover all substitutes and equivalents for the particular shapes and arrangements of parts which are herein disclosed merely to illustrate certain successfully workable forms of the invention.

I claim:

1. In a force measuring instrument, the combination of, reactive members movable in approximately vertical directions for transmitting a measurable force, a force transmitting knife-edge carrier on one of said members having lateral thrust surfaces disposed in substantially vertical planes paralleling the knife-edge of said carrier, a reactive force transmitting seat carrier on the other of said members having a substantially horizontal straight line of seating contact with said knife-edge and having a table surface bordering said knife-edge affording clearance for said carriers to rock relatively about said line of seating contact, and a single nose-like projection at each side of said knife-edge carrier rigid with said other member and displaced from a horizontal plane containing said line of seating contact and disposed to contact respectively and slidably with each of said lateral thrust surfaces of said knife-edge carrier whereby movement of each of said carriers relative to the other in vagrant directions crosswise said knife-edge is checked without impeding member movement for transmitting said measurable force.

2. In a force measuring instrument including mutually reactive members movable in approximately vertical directions for transmitting a measurable force, antifrictional play restricting devices for checking relative movement of said members in vagrant directions, including the combination with said members of, a force transmitting knife-edge carrier on one of said members having in at least one side thereof a vertically elongated groove, a reactive force transmitting seat carrier on the other of said members having a substantially horizontal line of seating contact with said knife edge and further having a table surface bordering said knife edge affording clearance for said carriers to rock relatively about said line of seating contact, and a plurality of nose-like projections rigid with one of said members displaced from a horizontal plane containing said line of seating contact and pointing crosswise said line toward the carrier on the other of said members for restricting play between said members in directions crosswise said knife-edge, at least one of said projections occupying the said groove.

3. In a force measuring instrument, the combination defined in claim 1, together with shoulders spaced lengthwise of the said knife-edge in fixed relation thereto and engaging opposite sides of each of the said nose-like projections at each side of the said knife edge carrier.

4. In a force measuring instrument, the combination defined in claim 1, in which the said nose-like projections point toward each other in coaxial relationship, together with shoulders spaced lengthwise of the said knife edge in fixed relation thereto and engaging opposite sides of at least one of the said nose-like projections.

5. In a force measuring instrument, the combination defined in claim 1, together with shoulders spaced lengthwise of the said knife-edge sunk inwardly into the said side of the said knife-edge carrier and engaging opposite sides of at least one of the said nose-like projections.

OSWALD S. CARLISS.